Oct. 10, 1944.     L. G. PICKHAVER     2,360,160
GAS-ARC WELDING APPARATUS
Filed Dec. 28, 1943
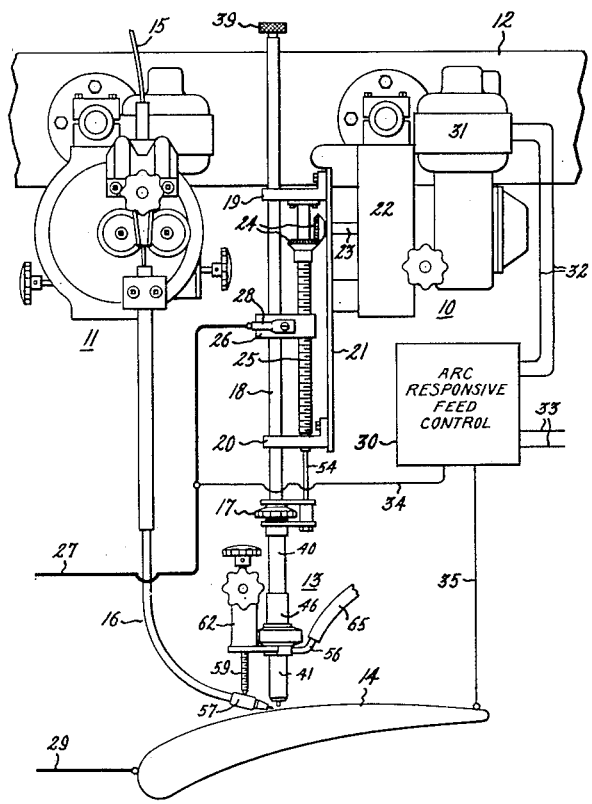
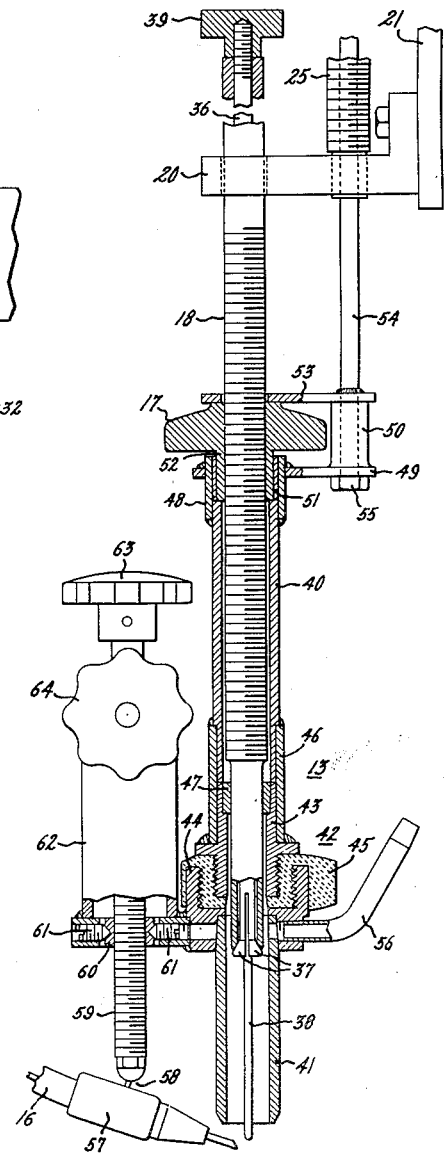
Inventor:
Lionel G. Pickhaver,
by Harry C. Dunham
His Attorney.

Patented Oct. 10, 1944

2,360,160

UNITED STATES PATENT OFFICE 2,360,160

GAS-ARC WELDING APPARATUS

Lionel G. Pickhaver, Chicago, Ill., assignor to General Electric Company, a corporation of New York Application December 28, 1943, Serial No. 515,925

10 Claims. (Cl. 219—8)

My invention relates to gas-arc welding apparatus of the type in which an arc is established between a substantially non-consuming electrode and the work in a shielding atmosphere of gas which is supplied through a nozzle to and about the arcing terminal portion of the electrode and the portions of the work rendered molten thereby.

Apparatus in accordance with my invention is particularly suited for fabricating articles made of readily oxidizable metals, such as magnesium and aluminum. When welding such metals the welding operation is preferably performed in an atmosphere of helium or argon in accordance with the methods disclosed and claimed in United States Letters Patent 1,746,081, Henry M. Hobart, February 4, 1930, or 1,746,191, Philip K. Devers, February 4, 1930, both of which are assigned to the assignee of this invention.

When welding in atmospheres of helium or argon it is desirable to position the discharge opening of the gas nozzle as close to the work as possible in order to reduce the amount of gas used. It is also desirable to perform the welding operation automatically since more uniform results are obtained thereby. Furthermore, since the electrode does not constitute a source of weld metal, some means must be provided for supplying weld filler material to the fusion zone of the arc in order to obtain a desired weld reinforcement.

It is an object of my invention to provide apparatus in which adjusting means is provided for positioning the arcing terminal of the electrode relative to the discharge opening in the gas nozzle and in which this adjusting means is fed toward and away from the work automatically in response to the voltage and length of the arc established between the electrode and the work so that substantially uniform welding conditions are established when the apparatus is traversed along flat, curved, or sloping work surfaces.

It is another object of my invention to provide means for feeding weld filler material into the fusion zone of the arc through the agency of a guide one end of which is adjustably attached to and movable with the support on which the electrode and gas nozzle are mounted for adjustment relative to one another.

Further objects of my invention will become apparent from the following consideration of the apparatus illustrated in the accompanying drawing.

Fig. 1 of this drawing is a front view of an embodiment of my invention in which like wire feeding mechanisms are employed for maintaining an arc of desired length and voltage between the welding electrode and the work and for feeding weld filler material into the fusion zone of the arc and Fig. 2 is an enlarged sectional view of that portion of Fig. 1 embodying the means for adjusting the electrode and nozzle relatively to one another and for adjustably directing the filler material into the fusion zone of the arc established between the electrode and the work.

In accordance with my invention a shielding gas is supplied about the arcing terminal portion of a substantially non-consuming electrode through the agency of a nozzle which encloses its arcing terminal portion. This nozzle and the holder for the electrode are adjustably positioned relative to one another in order to control the position of the arcing terminal of the electrode in the discharge opening of the nozzle. Means are provided for supplying gas to the nozzle and for connecting the electrode in said holder in an arc welding circuit which includes the work. An arc of predetermined length and voltage is maintained between the electrode and the work by moving the nozzle and electrode holder as a unit toward and away from the work through the agency of a feed rod whose longitudinal movement is controlled by a feeding means responsive to a characteristic of the welding circuit which varies with departures from said desired length and voltage of the arc. Means are also provided for feeding a strip of weld filler material into the fusion zone of the arc through a guide, one end of which is supported on the means for adjusting the electrode and nozzle relative to one another. Where the feeding means for the filler material and the feeding means for the electrode holder and nozzle are mounted on a common support, the guide for the filler material is so constructed as to provide relative movement between its ends. In the arrangement illustrated this relative movement is provided by a plurality of telescoping tubes respectively attached to the feeding means for the filler material and to the support for the electrode and nozzle.

The welding apparatus illustrated in Fig. 1 comprises two feeding mechanisms 10 and 11 mounted on a common support 12. These feeding mechanisms are illustrated as having the construction described and claimed in United States Patent 2,170,673, Jasper E. Anderson, granted August 22, 1939 and assigned to the assignee of this invention.

Feeding mechanism 10 is employed for positioning a gas-arc torch 13 relative to the work 14 and feeding mechanism 11 is employed for feeding a weld filler wire 15 through a guide 16 into the fusion zone of the arc established between the work and the electrode of gas-arc torch 13. As illustrated, this guide 16 comprises two telescoping tubes, the outer end of one of which is attached to feeding means 11 and the outer end of the other of which is adjustably attached to gas-arc torch 13.

Gas-arc torch 13 embodies a gas nozzle and an electrode holder which are adustably positioned relative to one another by means of a handwheel 17 forming part of its structure. This adjusting means is provided with a feed rod 18 mounted for longitudinal movement in brackets 19 and 20 supported on a plate-like member 21 which is attached to the gear box 22 of feeding means 10. The main axle 23 of this feeding means is connected through bevel gears 24 to a feed screw 25 which is mounted for rotation in brackets 19 and 20 about an axis parallel with the longitudinal axis of feed rod 18. A clamp 26 mounted on feed rod 18 has a threaded portion which makes a driving connection with feed screw 25 so that rotation of this feed screw imparts longitudinal movement to the feed rod. From the arrangement thus far described it is apparent that feeding means 10 will operate to move feed rod 18 toward and from the work and thereby position gas-arc nozzle 13 relative to the work.

Arc welding current is supplied to the electrode in gas-arc torch 13 through its holder and feed rod 18 by means of a welding circuit conductor 27 having its terminal 28 connected to feed rod clamp 26. Conductor 27 is connected to one terminal of a source of arc welding current whose other terminal is connected through a welding circuit conductor 29 to the work 14.

The operation of feeding means 10 is determined by an arc responsive feed control 30. Electric motor 31 of this feeding means is connected through conductors 32 and the control 30 to supply conductors 33. The control is also connected through control conductors 34 and 35 to be responsive to a characteristic of the welding circuit which varies with departures from a desired length and voltage of the welding arc established between the work 14 and the electrode of gas-arc torch 13. In the arrangement illustrated, control conductor 34 is connected to welding conductor 27 and control conductor 35 is connected to the work 14 so that control 30 is responsive to the voltage of the arc established between the work 14 and the electrode in gas-arc torch 13.

Any suitable arc responsive feed control may be employed and consequently the construction thereof has not been illustrated in the drawing. For example, the electronic control circuit of United States Letters Patent 2,175,017, William D. Cockrell, granted October 3, 1939, and assigned to the assignee of this invention may be used for controlling the speed and direction of rotation of motor 31 of feeding means 10 so as to maintain an arc of predetermined length and voltage between the work 14 and the electrode in gas-arc torch 13.

The structure of gas-arc torch 13 and its feed rod 18 is illustrated in greater detail in the sectional view thereof shown in Fig. 2.

As shown in this figure of the drawing, feed rod 18 is hollow and has a rod 36 extending lengthwise thereof. The lower end of this rod is constructed to form a collet which is seated against the lower end of feed rod 18. This collet comprises a plurality of jaws 37 formed by slotting the end of rod 36 which is provided with a longitudinal cylindrical cavity for holding an arc welding electrode 38. Each of its jaws 37 is provided with a bevelled surface which engages a corresponding bevelled surface formed on the lower end of feed rod 18. When an electrode is inserted in this collet it is apparent that a lengthwise movement of rod 36 will bring the wedging surfaces of jaws 37 of the collet into engagement with the wedging surface on the end of feed rod 18 and force these jaws 37 into holding engagement with the electrode. This lengthwise movement of collet rod 36 is obtained by a thumb nut 39 which makes a threaded engagement with the upper end of rod 36 and acts against the upper end of feed rod 18 from which the end of collet rod 36 projects.

The upper end of feed rod 18, as previously stated, is mounted for lengthwise movement in brackets 19 and 20 supported on member 21 which is attached to gear box 22 of feeding means 10. Its lower end is enclosed within a tubular member 40 forming part of the adjusting means operated by handwheel 17 for positioning electrode 38 relative to gas nozzle 41 of gas-arc torch 13.

Nozzle 41 is mounted on and electrically insulated from tubular member 40 and the electrode holding feed rod 18 therein by means of a coupling 42. This coupling is mounted on the lower end of member 40 and has a passageway therethrough for the electrode holding end of feed rod 18 which extends through member 40. Coupling 42 embodies metallic connecting members 43 and 44 which are united by a refractory material 45 which also electrically insulates these members from one another. Member 43 is attached through a sleeve 46 to the lower end of tubular member 40 and nozzle 41 is threaded into the passageway extending through member 44. Member 43 is also provided with a bushing 47 in which the collet holding end of feed rod 18 is seated for lengthwise movement.

The upper end of tubular member 40 is provided with a sleeve 48 which is attached thereto and forms a support for an arm 49 having a tubular boss 50 attached to its outer end. The upper portion of sleeve 48 forms a seat for a bushing 51 in which the hub 52 of handwheel 17 is rotatably supported. The lower end of hub 52 of handwheel 17 engages the upper end of tubular member 40 and the top surface of handwheel 17 is engaged and held by an arm 53 which is mounted on and attached to a guide rod 54. The lower end of this guide rod extends through boss 50 on arm 49 and has its end threaded for a nut 55 which engages arm 49 and holds arm 53 against the upper end of boss 50 of arm 49. It is thus seen that handwheel 17 is mounted for rotation and held between arm 53 and the upper end of tubular member 40.

Handwheel 17 makes a threaded engagement with the lower portion of feed rod 18 and rotation of this handwheel will cause it and tubular member 40 to move lengthwise relatively to one another. Tubular member 40 is prevented from turning by guide rod 54 which projects into a hollow cylindrical cavity extending lengthwise of feed screw 25 whose ends are mounted for rotation in brackets 19 and 20 on member 21 attached to gear box 22 of feeding means 10.

Relative movement between feed rod 18 and tubular member 40 obtained by rotation of handwheel 17 positions the discharge opening in nozzle 41 relative to the arcing terminal portion of electrode 38 which is held in the electrode holding portion of feed rod 18. This electrode is of the substantially non-consuming type being made preferably of tungsten or carbon.

Gas is supplied to nozzle 41 through a bent tube 56. One end of this tube is threaded into a hole extending laterally through the side wall of nozzle supporting member 44 of coupling 42. The upper end of nozzle 41 is perforated or cut away so that gas may pass through tube 56 into the upper portion of nozzle 41. The gas supplied to this nozzle will be discharged against the electrode holding collet and cool the same.

As previously stated, filler material is fed into the fusion zone of the arc through a guide 16 comprising two telescoping tubes one of which terminates in a guide nozzle 57. This guide nozzle 57 is supported by a ball and socket connection 58 from the lower end of an adjusting screw 59. This adjusting screw makes a threaded engagement with a ring 60 which is pivotally supported by screws 61 located in the lower portion of a housing 62 through which the upper end of adjusting screw 59 extends. The lower portion of housing 62 is attached to nozzle supporting member 44 of coupling 42 so that lengthwise or tilting movement of adjusting screw 59 will position nozzle 57 relative to the arcing terminal of electrode 38 in nozzle 41. Feed screw 59 is moved lengthwise of threaded ring 60 by imparting rotation thereto through the agency of a handwheel 63 attached to its upper end. A tilting movement is imparted to the upper end of adjusting screw 59 through the agency of a handwheel 64 which is provided with a shaft making a threaded engagement with the side wall of housing 62 and having an end portion engaging the upper end portion of adjusting screw 59. Longitudinal movement imparted to the shaft of handwheel 64 tilts adjusting screw 59 about the axes of screws 61 against the bias of a spring (not shown) which is mounted on the inside wall of housing 62 and acts against adjusting screw 59.

In the above description of the gas-arc nozzle frequent reference has been made to the fact that one part is attached to another. In the arrangement illustrated, this attachment comprises the several welds illustrated. It is, of course, apparent that other means may be employed for fabricating the assembly described and that certain parts may be made integral and properly machined in order to obtain the proportions illustrated and described.

The parts connected to gas-arc torch 13 are so constructed as to permit the unrestrained movement of the torch toward and away from the work in response to its control. The filler guide 16 has telescoping parts which permit movement of the torch relatively to feeding means 11. Electrode 38 is connected in the welding circuit through electrode holding collet rod 36, feed rod 18, and clamp 26 to which one terminal of a source of welding current is connected through a flexible conductor 27 so that this assembly may freely move toward and away from the work. The mobility of the torch is also insured by supplying gas to nozzle 41 through a rubber hose or some other flexible conduit 65 (Fig. 1) one end of which is connected with tube 56 (Fig. 2) of the gas-arc torch.

In view of the above description, the operation and use of the apparatus is believed to be obvious. Briefly stated, it is as follows:

Nut 39 on collet rod 36 is unscrewed sufficiently to release the electrode holding collet, an electrode 38 is then inserted therein, and nut 39 again tightened to close the collet jaws 37 into holding engagement with the electrode. The arcing terminal portion of the electrode is then adjusted relatively to the discharge opening of nozzle 41 by turning handwheel 17 to move feed rod 18 and collet rod 36 therein relative to tubular member 40 to the lower end of which nozzle 41 is attached through insulating coupling 42. Handwheel 17 is threaded on feed rod 18 and is held against lengthwise movement on the upper end of tubular member 40 by arm 53 which engages the upper end surface of the handwheel and holds it on the upper end of tubular member 40 through the agency of arm 49 attached thereto. Tubular member 40 is prevented from turning with the handwheel by guide rod 54 one end of which projects into a hollow cylindrical cavity extending lengthwise of feed screw 25.

Feed rod 18 is moved lengthwise of its supporting brackets 19 and 20 by clamp 26 which makes a thread engagement with feed screw 25. The speed and direction of rotation of this feed screw is under the control of feeding means 10 which in turn is under the control of the arc responsive feed control 30. Control 30 is responsive to the voltage and length of the arc established between electrode 38 and the work 14 by reason of its connections 34 and 35. Any departure from a desired arc length and voltage of the welding arc causes control 30 to operate motor 31 of feeding means 10 to cause the feed means to reestablish the desired arc length and voltage by imparting the proper direction and speed of rotation to feed screw 25.

During welding filler material may be fed into the fusion zone of the arc by feeding means 11. It is apparent that this feeding means may be started and stopped at the will of the operator or may be controlled so as to start feeding filler material as soon as the welding arc has been established. It is also obvious that the operating speed of feeding means 11 may be suitably controlled so as to provide a constant rate of feeding the filler material or to provide an intermittent or oscillating feeding thereof, if such is desired.

Before the welding operation is initiated, gas is supplied to nozzle 41 through hose 65 from a suitable source of supply. The welding circuit conductors 27 and 29 are then energized and upon energization of supply conductors 33 of feeding means 10 this mechanism, through the agency of its arc responsive feed control 30, will operate to advance the gas-arc nozzle and electrode toward and away from the work to strike and thereafter maintain an arc of predetermined length and voltage between the electrode and the work. If the torch 13 is traversed along a sloping or curving surface, such as the wing section illustrated, it will accurately follow the surface of the work maintaining a substantially constant spacing of gas nozzle 41 therefrom. Since the electrode is very slowly consumed during welding an occasional adjustment of the nozzle relatively to the electrode may be necessary to maintain the desired clearance between the gas nozzle and the work. This may be accomplished by turning handwheel 17. To economize on the use of gas the nozzle spacing should be as small as possible. During welding the direction in which the filler material is fed into the fusion zone may be controlled by adjusting the filler guide nozzle 57 relative to the gas-arc torch through the agency of hand-wheels 63 and 64.

It is obvious that suitable control arrangements may be provided for starting and stopping the welding operation by actuation of one or more pushbuttons forming part thereof. Such arrangements would embody control 30 and other controls for securing a desired sequence of operations such as supplying gas to nozzle 41 before the welding arc is established and continuing the flow of gas through nozzle 41 for a predetermined time interval after a welding operation has been stopped by disconnecting the welding circuit from its source of supply.

It is apparent that my invention is not limited to the particular structure illustrated and described since other embodiments will readily suggest themselves to those skilled in the art.

Thus, for example, in the arrangement illustrated feed rod 18 is under the control of feeding means 10 so that adjustment of handwheel 17 causes nozzle 41 to move relatively to electrode 38 held in feed rod 18 by collet rod 36. It is, of course, apparent that the arrangement could be reversed so that guide rod 54 is engaged by clamp 26 and thus put under the control of feeding means 10. In such case operation of handwheel 17 would cause the electrode holding rods 18 and 36 to move relative to nozzle 41.

Furthermore, other feeding means than that described may be used without departing from my invention. Thus feeding means 10 may be replaced by a gear-motor having sufficient speed reduction to eliminate feed screw 25 which with its cooperating parts could be replaced with a rack and pinion. Feed rod 18 would in such case be attached to or from the rack of this rack and pinion drive.

Another obvious modification would eliminate gears 24 of the arrangement illustrated by coupling the armature shaft of the feed motor directly to feed screw 25 which imparts movement to feed rod 18.

Other wire feeding means than that shown at 11 may be used for feeding weld filler material into the fusion zone of the arc. Variations and equivalents of the guide for this filler material and its features of adjustment will occur to those skilled in the art.

It is also apparent that shielding gases other than argon or helium may be used and that instead of feeding weld filler material to the arc a strip of flux material might be fed thereto by the same mechanism illustrated and described for feeding weld filler material.

While I have shown and described but one embodiment of my invention, it is apparent that other embodiments thereof will occur to those skilled in the art and I, therefore, intend to cover by the appended claims all such modifications of my invention as fall within the true spirit and scope thereof.

What I claim as new and desire to secure by Letters Patent of the United States is:

1. Gas-arc welding apparatus comprising electrode holding means, means including a nozzle for supplying gas about the arcing terminal of an electrode in said electrode holding means, means for adjusting said electrode and said nozzle relatively to one another to position the arcing terminal of said electrode relatively to the discharge opening of said nozzle, means for connecting said electrode in an arc welding circuit including the work, and means responsive to a characteristic of said arc welding circuit which varies with departures from a desired length and voltage of the arc established between said electrode and the work for maintaining that position of said adjusting means relative to the work which will establish an arc of said predetermined length and voltage between said electrode and the work.

2. Gas-arc welding apparatus comprising means for holding a substantially non-consuming electrode, means including a nozzle for supplying gas about the arcing terminal of said electrode and an arc established between said electrode and the work, means for adjusting said electrode and said nozzle relatively to one another to position the arcing terminal of said electrode relatively to the discharge opening of said nozzle, means for supplying gas to said nozzle, means for connecting said electrode in an arc welding circuit including the work, means for electrically insulating said nozzle from said electrode, means for moving said adjusting means toward and away from the work, and means responsive to a characteristic of said welding circuit through said electrode and the work for controlling said last mentioned means to strike and maintain an arc of predetermined length and voltage between said electrode and the work.

3. Gas-arc welding apparatus comprising an electrode holder, a gas nozzle mounted on said holder and enclosing the arcing terminal portion of an electrode in said holder, means for adjusting said electrode holder and said nozzle relatively to one another and thereby controlling the position of the arcing terminal of said electrode relative to the discharge opening in said nozzle, means for supplying gas to said nozzle and about the arcing terminal portion of said electrode, means for connecting said electrode holder in an arc welding circuit including said electrode and the work, and means responsive to a characteristic of the welding circuit that varies with departure from a desired length and voltage of the arc established between said electrode and the work for feeding said electrode holder and said nozzle as a unit toward and away from the work to strike and maintain an arc of said predetermined length and voltage between said electrode and the work.

4. Gas-arc welding apparatus comprising a holder for a substantially non-consuming electrode, a gas nozzle mounted on one end of said holder about the arcing terminal portion of said electrode in said holder, means for adjusting said electrode holder and said nozzle relatively to one another and thereby controlling the position of the arcing terminal of said electrode in said holder relative to the discharge opening in said nozzle, means for supplying gas to said nozzle about the arcing terminal portion of said electrode in said holder, a feed rod attached to the other end of said holder, a support in which said feed rod is mounted for lengthwise movement, a feed screw mounted for rotation on said support about an axis parallel with the longitudinal axis of said feed rod, a clamp mounted on said feed rod and having a threaded driving connection with said feed screw, means attached to said clamp for supplying arc welding current through said feed rod and said holder to said electrode therein, and means responsive to a characteristic of the welding circuit which varies with departures from a desired length and voltage of the arc established between said electrode and the work for controlling the rotation of said feed screw and the lengthwise movement of said feed rod to maintain an arc of said predetermined length and voltage between said electrode and the work.

5. Gas-arc welding apparatus comprising a holder for a substantially non-consuming electrode, a gas nozzle mounted on one end of said holder about the arcing terminal portion of said electrode in said holder, means for adjusting said electrode holder and said nozzle relatively to one another and thereby controlling the position of the arcing terminal fo said electrode in said holder relative to the discharge opening in said nozzle, means for supplying gas to said nozzle about the arcing terminal portion of said electrode in said holder, means for feeding a strip of material into the fusion zone of an arc established between said electrode and the work, means adjustably mounted on said holder for directing said strip of material into the fusion zone of said arc, a feed rod attached to the other end of said holder, a support in which said feed rod is mounted for lengthwise movement, a feed screw mounted for rotation on said support about an axis parallel with the longitudinal axis of said feed rod, a clamp mounted on said feed rod and having a threaded driving connection with said feed screw, means attached to said clamp for supplying arc welding current through said feed rod and said holder to said electrode therein, and means responsive to a characteristic of the welding circuit which varies with departures from a desired length and voltage of the arc established between said electrode and the work for controlling the rotation of said feed screw and the lengthwise movement of said feed rod to maintain an arc of said predetermined length and voltage between said electrode and the work.

6. Apparatus of the type wherein an arc is established in a desired gaseous atmosphere between an electrode and the work, said apparatus comprising means including a nozzle for supplying gas about the fusion zone of said arc, means for supporting said electrode and said gas nozzle so that the arcing terminal portion of said electrode is within said nozzle and projects from its discharge opening, means on said supporting means for adjusting said electrode and said nozzle relatively to one another to control the position of the arcing terminal of said electrode relatively to the discharge opening of said nozzle, means for connecting said electrode in an arc welding circuit including the work, means responsive to a characteristic of said welding circuit that varies with departure from a desired voltage and length of an arc established between said electrode and the work for feeding said supporting means toward and away from the work to strike and establish an arc of said predetermined length and voltage between said electrode and the work, means including a wire guide mounted on said supporting means for directing a weld filler wire into the fusion zone of said arc, means for lengthwise feeding said filler wire into the fusion zone of said arc, means for conducting said filler wire from its feeding means to said wire guide on said supporting means, said means including a plurality of telescoping tubes respectively attached to said wire guide and said wire feeding means and movable relatively to one another toward and away from the work, and means for supporting each of said feeding means in predetermined positions relative to one another.

7. Gas-arc welding apparatus in which an arc is established in a desired gaseous atmosphere between a substantially non-consuming electrode and the work, said apparatus comprising means including a nozzle for supplying gas about the fusion zone of an arc established between said electrode and the work, means for supporting said electrode and said gas nozzle so that the arcing terminal portion of said electrode is within said nozzle and projects from its discharge opening, means on said supporting means for adjusting said electrode and said nozzle relatively to one another to control the position of the arcing terminal of said electrode relatively to the discharge opening of said nozzle, means including a wire guide adjustably mounted on said supporting means for directing a weld filler wire into the fusion zone of said arc, means on said supporting means for electrically insulating said electrode from said wire guide and said nozzle, means for lengthwise feeding said filler wire into the fusion zone of said arc, means for conducting said filler wire from its said feeding means to said wire guide on said supporting means, said means including a wire directing conduit having end portions movable relatively to one another and respectively attached to said wire guide and said wire feeding means, means for connecting said electrode in an arc welding circuit including the work to be welded, means responsive to a characteristic of said welding circuit for maintaining an arc of predetermined length and voltage between said electrode and the work to be welded and thereby controlling the position of said supporting means relative to the work to be welded, and means for supporting each of said feeding means in predetermined positions relative to one another.

8. Gas-arc welding apparatus in which an arc is established in a desired gaseous atmosphere between a substantially non-consuming electrode and the work, said apparatus comprising a holder for said electrode, a gas nozzle mounted on one end of said holder about the arcing terminal portion of said electrode, means for adjusting said electrode holder and said nozzle relatively to one another and thereby controlling the position of the arcing terminal of said electrode relative to the discharge opening in said nozzle, means for supplying gas to said nozzle and about the arcing terminal portion of said electrode, a feed rod attached to the other end of said holder, a support in which said feed rod is mounted for lengthwise movement, a feed screw mounted for rotation on said support about an axis parallel with the longitudinal axis of said feed rod, a clamp mounted on said feed rod and having a threaded driving connection with said feed screw, means attached to said clamp for supplying arc welding current through said feed rod and said holder to said electrode therein, means responsive to a characteristic of the welding circuit which varies with departures from a desired length and voltage of the arc established between said electrode and the work for rotating said feed screw to control the lengthwise movement of said feed rod and establish an arc of said predetermined length and voltage between said electrode and the work, means for feeding a filler wire into the fusion zone of the arc established between the work and said electrode, a filler wire guide formed of a plurality of telescoping tubes one of which is attached to said wire feeding means and the other of which is adjustably attached to said electrode holder, means for electrically insulating said tubes and said nozzle from said feed rod and said holder, and means for holding said support and said wire feeding means in predetermined positions relative to one another.

9. Gas-arc welding apparatus comprising a substantially non-consuming electrode, a holder for said electrode, a gas nozzle mounted on one end of said holder about the arcing terminal portion of said electrode, means for adjusting said electrode holder and said nozzle relatively to one another and thereby controlling the position of the arcing terminal of said electrode relative to the discharge opening in said nozzle, means for supplying gas to said nozzle and about the arcing terminal portion of said electrode, a feed rod attached to the other end of said holder, a member in which said feed rod is mounted for lengthwise movement, a feed screw mounted for rotation on said member about an axis parallel with the longitudinal axis of said feed rod, a clamp mounted on said feed rod and having a threaded driving connection with said feed screw, means attached to said clamp for supplying arc welding current through said feed rod and said holder to said electrode, means responsive to a characteristic of the welding circuit which varies with departures from a desired length and voltage of the arc established between said electrode and the work for rotating said feed screw to control the lengthwise movement of said feed rod and establish an arc of said predetermined length and voltage between said electrode and the work, means for feeding a weld filler wire into the fusion zone of the arc established between the work and said electrode, a filler wire guide formed of a plurality of telescoping tubes one of which is attached to said wire feeding means and another of which is attached to said electrode holder, and a support on which said member and said wire feeding means are mounted adjacent one another.

10. Gas-arc welding apparatus comprising a substantially non-consuming electrode, a holder for said electrode, a gas nozzle mounted on one end of said holder about the arcing terminal portion of said electrode, means for adjusting said electrode holder and said nozzle relatively to one another and thereby controlling the position of the arcing terminal of said electrode relative to the discharge opening in said nozzle, means for supplying gas to said nozzle and about the arcing terminal portion of said electrode, a feed rod attached to the other end of said holder, a member in which said feed rod is mounted for lengthwise movement, a feed screw mounted for rotation on said member about an axis parallel with the longitudinal axis of said feed rod, a clamp mounted on said feed rod and having a threaded driving connection with said feed screw, means attached to said clamp for supplying arc welding current through said feed rod and said holder to said electrode, means responsive to a characteristic of the welding circuit which varies with departures from a desired length and voltage of the arc established between said electrode and the work for rotating said feed screw to control the lengthwise movement of said feed rod and establish an arc of said predetermined length and voltage between said electrode and the work, means for feeding a weld filler wire into the fusion zone of the arc established between the work and said electrode, a filler wire guide formed of a plurality of telescoping tubes one of which is attached to said wire feeding means and another of which is adjustably attached to said electrode holder, means for electrically insulating said wire guide and said nozzle from said electrode holder and said feed rod, and a support on which said member and said wire feeding means are mounted adjacent one another.

LIONEL G. PICKHAVER.